US012652462B2

(12) United States Patent (10) Patent No.: US 12,652,462 B2
Katsumata (45) Date of Patent: Jun. 9, 2026

(54) IMAGE PICKUP APPARATUS, ITS CONTROL METHOD WITH SLOT ANTENNA, AND STORAGE MEDIUM

(71) Applicant: CANON KABUSHIKI KAISHA, Tokyo (JP)

(72) Inventor: Momoe Katsumata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 50 days.

(21) Appl. No.: 18/658,253

(22) Filed: May 8, 2024

(65) Prior Publication Data

US 2024/0422427 A1    Dec. 19, 2024

(30) Foreign Application Priority Data

Jun. 19, 2023    (JP) ................................. 2023-099890

(51) Int. Cl.
| *H04N 23/66* | (2023.01) |
| *G03B 17/56* | (2021.01) |
| *H04N 23/51* | (2023.01) |
| *H04N 23/62* | (2023.01) |
| *H04N 23/65* | (2023.01) |

(52) U.S. Cl.
CPC ........... *H04N 23/66* (2023.01); *G03B 17/563* (2013.01); *H04N 23/51* (2023.01); *H04N 23/62* (2023.01); *H04N 23/65* (2023.01)

(58) Field of Classification Search
CPC ........ H04N 23/66; H04N 23/51; H04N 23/62; H04N 23/65; G03B 17/563

USPC ....................................................... 348/211.2
See application file for complete search history.

(56) References Cited

U.S. PATENT DOCUMENTS

| 7,768,462 | B2 * | 8/2010 | Zhang | .................... H01Q 1/243 |
| | | | | 343/702 |
| 8,725,213 | B2 * | 5/2014 | Nakamura | ............. H01Q 1/243 |
| | | | | 455/562.1 |
| 9,490,885 | B1 * | 11/2016 | Zheng | .................... H04W 52/42 |
| 9,559,425 | B2 * | 1/2017 | Zhu | ........................ H01Q 1/243 |
| 9,859,607 | B2 * | 1/2018 | Hwang | .................... H01Q 1/48 |
| 2006/0087564 | A1 * | 4/2006 | Kawamura | ............ H04N 23/66 |
| | | | | 348/E5.042 |
| 2014/0240581 | A1 * | 8/2014 | Sung | ...................... G03B 17/02 |
| | | | | 348/335 |
| 2014/0361979 | A1 * | 12/2014 | Woo | ..................... H04B 1/0475 |
| | | | | 343/702 |
| 2016/0036474 | A1 * | 2/2016 | Broyde | ............. H01Q 21/0006 |
| | | | | 455/77 |
| 2017/0346163 | A1 * | 11/2017 | Lee | ....................... H01Q 1/2283 |
| 2018/0301787 | A1 * | 10/2018 | Han | ..................... H04B 7/0404 |
| 2019/0173158 | A1 * | 6/2019 | Azad | ........................ H01Q 1/48 |

(Continued)

FOREIGN PATENT DOCUMENTS

| JP | 2017228982 A | 12/2017 |
| JP | 7157964 B2 | 10/2022 |

*Primary Examiner* — Usman A Khan

(74) *Attorney, Agent, or Firm* — Cowan, Liebowitz & Latman, P.C.

(57) ABSTRACT

An image pickup apparatus is capable of wireless communication with an external device and includes a housing made of metal and having a slit and provided in one of a front surface on an object side, a rear surface, and a side surface of the image pickup apparatus, and a feed substrate configured to supply power to the slit to enable wireless communication using the slit as a slot antenna.

13 Claims, 5 Drawing Sheets

(56) References Cited

U.S. PATENT DOCUMENTS

2019/0335075 A1* 10/2019 Ueda ........................ H01Q 1/22
2024/0052673 A1*  2/2024 Morris ................... E05B 41/00

* cited by examiner

IMAGE PICKUP APPARATUS, ITS CONTROL METHOD WITH SLOT ANTENNA, AND STORAGE MEDIUM

BACKGROUND

Technical Field

One of the aspects of the embodiments relates to an image pickup apparatus having a wireless communication function.

Description of Related Art

An image pickup apparatus such as a digital camera having a wireless communication function can communicate image data and other information with an external device. Although the housing of the image pickup apparatus is often made of metal for strength reasons, a metal housing near a wireless communication antenna may negatively affect wireless communication, and thus the area around the antenna is to be covered with a resin material that transmits radio waves.

In order to support large-capacity data communications, Multi Input Multi Output (MIMO) technology for providing communications using a plurality of antennas is known, and the image pickup apparatus is also demanded to have a plurality of antennas. However, in a case where the housing is made of metal, the number and locations of antennas are limited.

Japanese Patent Laid-Open No. 2017-228982 discloses an apparatus that suppresses a decrease in antenna gain by optimizing the arrangement of slot antennas. Japanese Patent No. 7157964 discloses an apparatus with a metal housing having excellent communication performance by placing a slot antenna away from an area where many metal parts are disposed.

The slot antenna requires a slit with a length determined by a frequency to be used. Thus, in a case where the slot antenna is disposed in an image pickup apparatus that has many operation members, the arrangement location is limited.

SUMMARY

An image pickup apparatus according to one aspect of the disclosure is capable of wireless communication with an external device and includes a housing made of metal and having a slit and provided in one of a front surface on an object side, a rear surface, and a side surface of the image pickup apparatus, and a feed substrate configured to supply power to the slit to enable wireless communication using the slit as a slot antenna.

An image pickup apparatus according to another aspect of the disclosure includes a front housing made of metal, disposed on an object side, and having a first slit and a second slit, the front housing including a first grip portion to be gripped by a user at a normal position of the image pickup apparatus, and a second grip portion to be gripped by the user at a vertical position of the image pickup apparatus, a feed substrate configured to supply power to the first slit and the second slit to enable wireless communication using the first slit and the second slit as slot antennas, and a control unit configured to select one of the first slit and the second slit to which power is to be supplied, according to which of the first grip portion and the second grip portion is being gripped by the user. A control method of the above image pickup apparatus also constitutes another aspect of the disclosure. A storage medium storing a program that causes a computer to execute the above control method also constitutes another aspect of the disclosure.

Further features of various embodiments of the disclosure will become apparent from the following description of embodiments with reference to the attached drawings.

DESCRIPTION OF THE EMBODIMENTS

Referring now to the accompanying drawings, a detailed description will be given of embodiments according to the disclosure.

Figure 1:
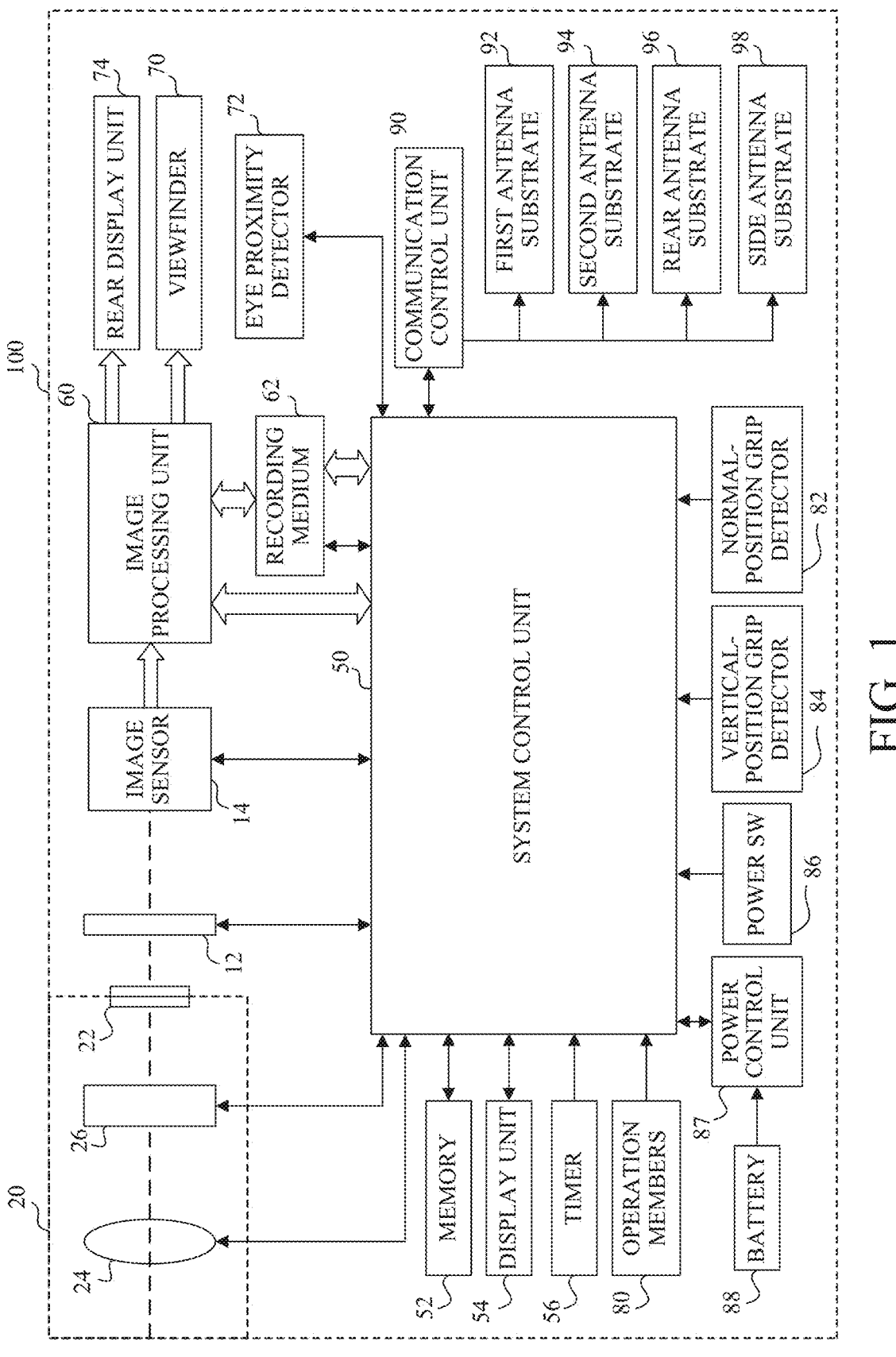
FIG. 1 is a block diagram illustrating the internal configuration of a digital camera according to this embodiment.

FIG. 1 illustrates the internal configuration of a digital camera (simply referred to as camera hereinafter) 100 as an image pickup apparatus according to this embodiment. An imaging lens 20 is attachable to and detachable from the camera 100 via a lens mount 22 as a lens attachment unit. The imaging lens 20 has an imaging optical system including a plurality of lenses including a focus lens 24 and an aperture stop (diaphragm) 26.

A light beam entering the imaging optical system from an object is guided to an image sensor 14 via the aperture stop 26 and a shutter 12, and forms an object image as an optical image on an imaging surface of the image sensor 14. The shutter 12 controls an exposure amount of the image sensor 14 by opening and closing operations. The image sensor 14 is a photoelectric conversion element such as a CMOS sensor, and photoelectrically converts (images) the object image and outputs an imaging signal.

A system control unit 50 as a control unit is a computer including a CPU and the like, and controls the camera 100 and the imaging lens 20. The system control unit 50 operates using operational constants, variables, programs, etc. stored in a memory 52 and time information from a timer 56. An image processing circuit 60 performs various image processing for the imaging signal from the image sensor 14 to generate image data. The image data is displayed as a live-view image on a rear display unit 74 or an electronic viewfinder 70, or is recorded on a recording medium 62 as a recording image. The system control unit 50 detects the user peeping into an eyepiece unit of the electronic viewfinder (simply referred to as viewfinder hereinafter) 70 using an eye proximity detector 72 that includes an optical proximity sensor or the like, and thereby switches between turning on and off of image display. As the detector of a user, the eye proximity detector 72 detects the presence or absence of an object that is close to the eye proximity detector 72, for example. If there is a close object detected, it can be assumed that user's eye is close to the viewfinder 70 can be assumed. The user can observe the object through the viewfinder 70 and the rear display unit 74.

The system control unit 50 also performs autofocus (AF) by controlling the focus lens 24 based on a calculation result using image data, and performs auto-exposure control (AE) by controlling the aperture stop 26 and shutter 12. The display unit 54 displays information regarding imaging set by the system control unit 50 or the user.

Operation members 80 include various buttons, switches, etc., and each of them is operable by the user to select and set various functions during imaging, playback, communication with the external device, etc., and to issue instructions for imaging and playback. The operation members 80 outputs an instruction signal according to the user's operation to the system control unit 50, and the system control unit 50 performs an operation according to the instruction signal.

A normal-position grip detector 82 detects that the user is holding a normal-position grip portion of the camera 100. A vertical-position grip detector 84 detects that the user is gripping a vertical-position grip portion of the camera 100. Each of the normal-position grip detector 82 and the vertical-position grip detector 84 include a piezoelectric elements or the like. The normal-position grip portion and the vertical-position grip portion will be described below. The system control unit 50 controls power supply from an antenna substrate (described below) to the slit according to the detection result of the used grip portion of the user detected by the normal-position grip detector 82 and the vertical-position grip detector 84 and the eye proximity detection result of the user to the viewfinder 70 by the eye proximity detector 72 described above.

A power switch 86 instructs the system control unit 50 to turn on or off the power of the camera 100 in response to a user operation. The power supply control circuit 87 includes a battery detecting circuit, a DC/DC converter, a switch circuit that switches a block to which electricity is supplied in the camera 100, and the like. The power supply control circuit 87 detects the type and remaining battery level of the battery 88 attached to the camera 100, and supplies necessary voltage to each block based on the detection result and instruction from the system control unit 50.

A communication control unit 90 controls wireless communication with an external device via a first antenna substrate (first feed substrate) 92, a second antenna substrate (second feed substrate) 94, a rear antenna substrate (third feed substrate) 96, and a side antenna substrate 98 as feed substrates. The system control unit 50 can transmit and receive image data and various information to and from the external device through wireless communications via the communication control unit 90.

Figure 2:
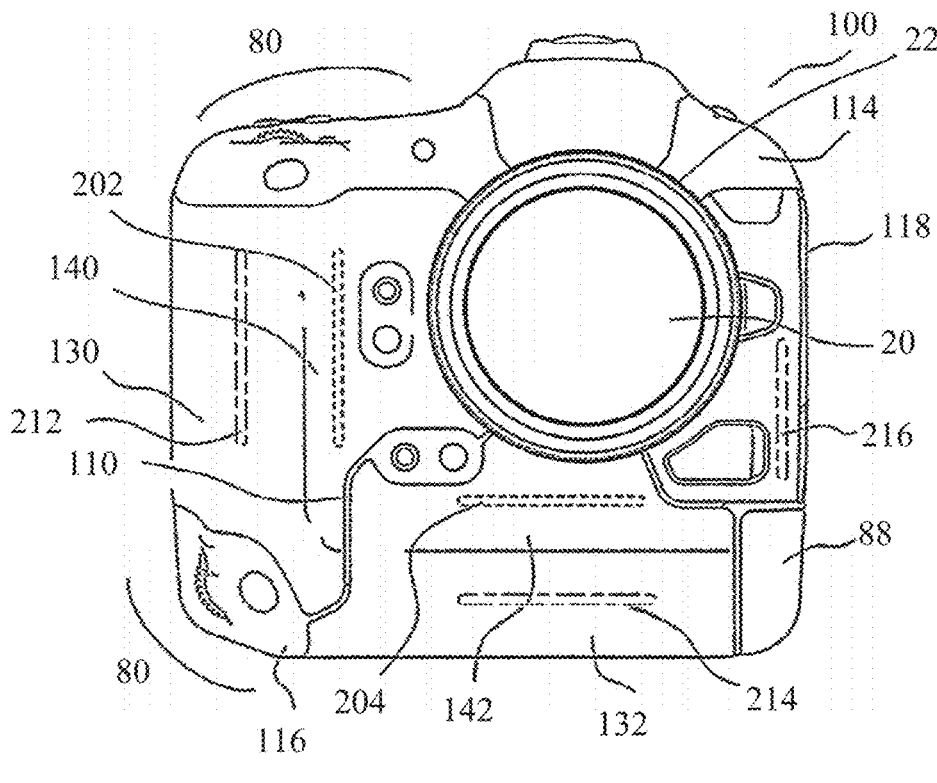
FIG. 2 is a front view of the digital camera according to this embodiment.
Figure 4:
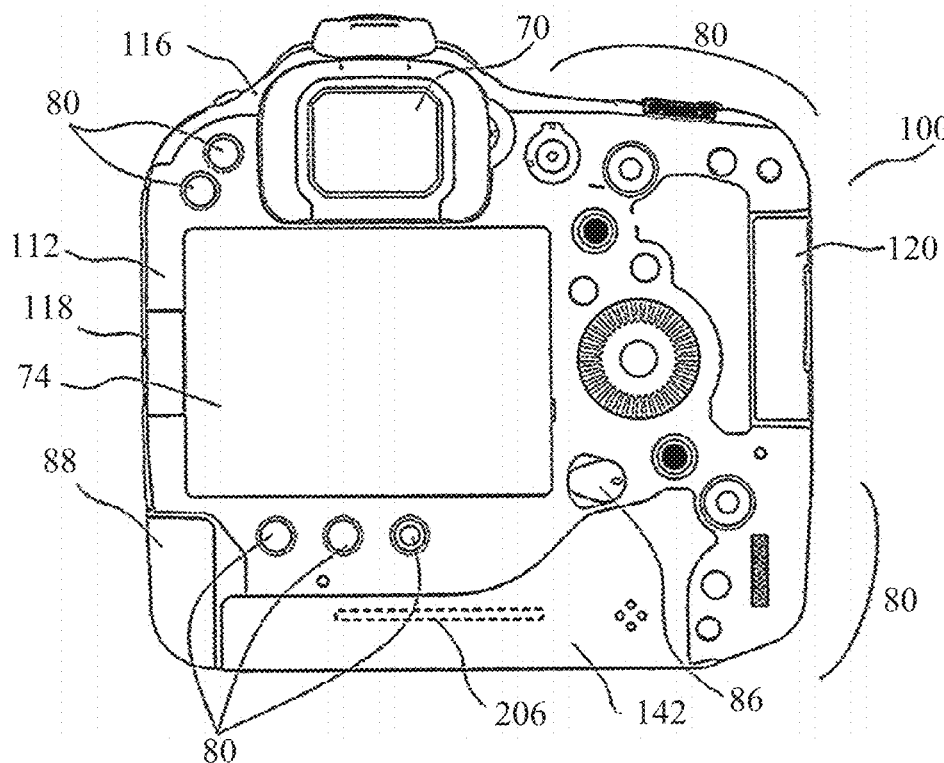
FIG. 4 is a rear view of the digital camera according to this embodiment.
Figure 5:
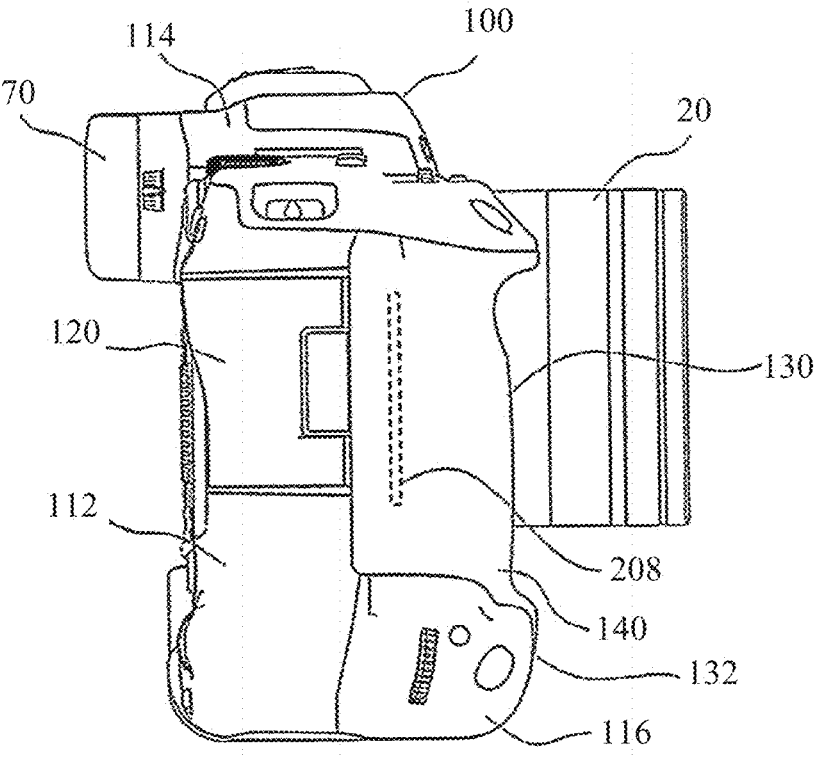
FIG. 5 is a side view of the digital camera according to this embodiment.

FIG. 2 illustrates the appearance of the camera 100 when viewed from the front (object side), FIG. 4 illustrates the appearance of the camera 100 when viewed from the back, and FIG. 5 illustrates the appearance of the camera 100 when viewed from the normal grip side.

The camera 100 includes a housing that includes a front cover (front housing) 110, a rear cover (rear housing) 112, a top cover (upper housing) 114, and a bottom cover (bottom housing) 116, each made of metal. The housing also includes a side cover (side housing) 118 and a media cover 120, each made of metal or resin. A normal-position grip portion 130 is provided on the right side of the front cover 110 and serves as a first grip portion that projects to the front (towards the object). A vertical-position grip portion 132 is provided at the lower portion of the front cover 110 and serves as a second grip portion that projects to the front.

Figure 3:
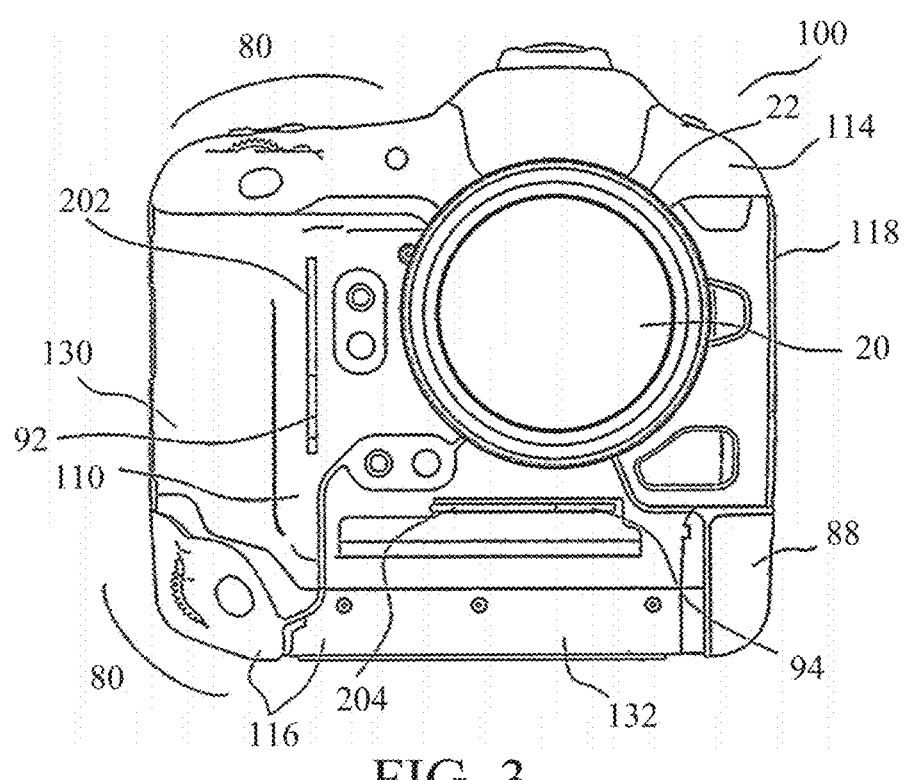
FIG. 3 is a front view of the digital camera according to this embodiment with front rubber and bottom rubber removed.

The user can hold the camera 100 at the normal position (horizontal position) and the vertical position. The normal position is a camera position (attitude or orientation) in which the upper parts of the camera 100 (the top cover 114, the operation members 80 such as the imaging instruction switch) face upward, as illustrated in FIGS. 2 to 4. The normal-position grip portion 130 is a portion that the user is to grip in a case where the user holds the camera 100 at the normal position. The vertical position is a camera position in which the top of the camera 100 faces the side. The vertical-position grip portion 132 is a portion that the user is to grip in a case where the user holds the camera 100 at the vertical position.

A part of the outer surface of the housing is covered with an elastic and nonconductive rubber member in order to improve the gripping performance in a case where the user holds the camera 100. More specifically, front rubber 140 is attached to the outer surface of the area of the front cover 110 from the right side of the lens mount 22 to the right side surface of the normal-position grip portion 130 (from the left side of the lens mount 22 to the left side surface in FIG. 2) with conductive double-sided tape (not illustrated). In addition, bottom rubber 142 is attached to the outer surface of the area of the front cover 110 from the lower side of the lens mount 22 to the lower part of the rear cover 112 via the vertical-position grip portion 132 with nonconductive double-sided tape (not illustrated).

FIG. 3 illustrates the camera 100 viewed from the front with the front rubber 140 and bottom rubber 142 removed from the front cover 110. As illustrated by a broken line in FIG. 2 and a solid line in FIG. 3, a first slit 202 is formed in an area on the rear side of the front rubber 140 in the front cover 110 between the lens mount 22 and the normal-position grip portion 130, and extends so that a top-bottom direction of the camera 100 is a longitudinal direction. The top-bottom direction is a direction in which the normal-position grip portion 130 extends. A second slit 204 is formed in an area on the rear side of the bottom rubber 142 of the front cover 110 and extends between the lens mount 22 and the vertical-position grip portion 132, and extends so that a left-right direction of the camera 100 is a longitudinal direction. The left-right direction is a direction in which the vertical-position grip portion 132 extends.

As illustrated by an alternate long and short dash line in FIG. 2, instead of the first slit 202 and the second slit 204, a first slit 212 may be formed in the normal-position grip portion 130 and a second slit 214 may be formed in the vertical-position grip portion 132. In addition, as illustrated by an alternate long and two short dashes line in FIG. 2, a first slit 216 may be provided in the front cover 110 at a position between the lens mount 22 and the side cover 118.

In this embodiment, the camera 100 is a lens interchangeable type camera having a lens mount 22 to which the imaging lens 20 is detachably attached, but the camera may be a lens integrated type camera. In this case, the portion to which the imaging lens is fixed is assumed to be a lens attachment unit.

Further, as illustrated by a broken line in FIG. 4, a rear slit 206 as a third slit extending in the left-right direction of the camera 100 is provided at the lower part of the rear cover 112. As illustrated by a broken line in FIG. 5, a side slit 208 extending in the top-bottom direction of the camera 100 is provided on the side surface of the normal-position grip portion 130 of the front cover 110. The side slit 208 may be formed in the media cover 120 in a case where the media cover 120 is made of metal. Since the side slit 208 is provided in the front cover 110, it may be regarded as a first slit like the first slit 202.

The length of each slit in the longitudinal direction is set to be approximately equal to the wavelength λ/2 of the frequency f of the wireless communication via the communication control unit 90. For example, in a case where the wireless communication frequency is 2.4 GHz, λ/2=49 mm, and when the frequency is 5 GHZ, λ/2=32.5 mm. Although FIGS. 2 to 4 illustrate each slit extending linearly, it may also have a polygonal line shape with some bends.

The normal-position grip portion 130 and the vertical-position grip portion 132 may be covered with a noncon-ductive member such as a resin part or a sheet part instead of the front rubber 140 and the bottom rubber 142.

Figures 6, 7:
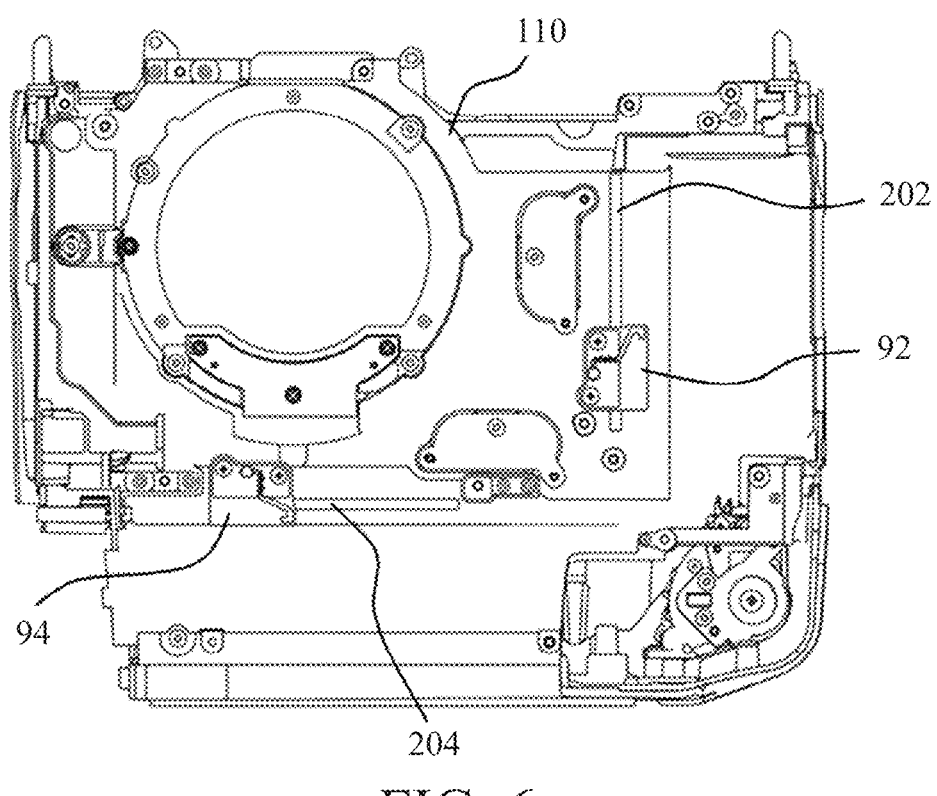
FIG. 6 illustrates the inside of the front cover of the digital camera according to this embodiment.
FIG. 7 illustrates an antenna substrate and slit of a vertical-position grip portion of the digital camera according to this embodiment.

FIG. 6 illustrates the configuration of the inside (rear side) of the front cover 110 when viewed from the rear side. The first antenna substrate 92 is provided at a position corre-sponding to the first slit 202 on the inner surface of the front cover 110, and supplies power to the first slit 202. The second antenna substrate 94 is provided at a position cor-responding to the second slit 204 on the inner surface of the front cover 110, and supplies power to the second slit 204.

Although not illustrated, the rear antenna substrate 96 is provided at a position corresponding to the rear slit 206 on the inner surface of the rear cover 112, and supplies power to the rear slit 206. Although not illustrated in FIG. 6, the side antenna substrate 98 is provided at a position corre-sponding to the side slit 208 on the inner surface of the front cover 110, and supplies power to the side slit 208.

By supplying power to each slit from each antenna substrate, each slit functions as a slot antenna and can perform wireless communication.

Figure 8:
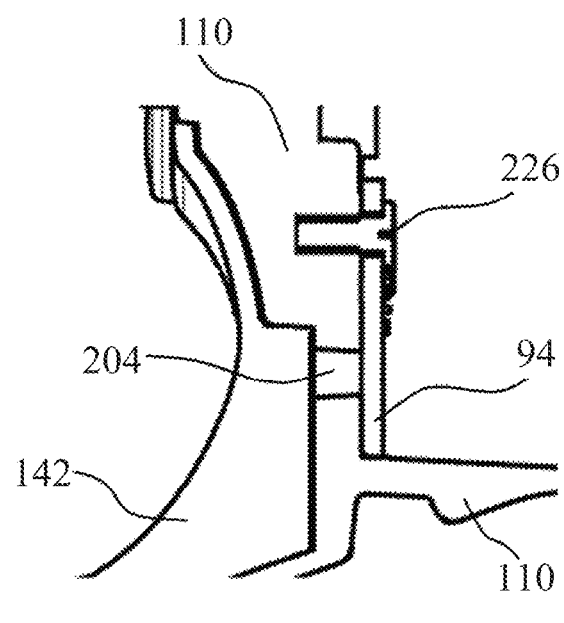
FIG. 8 is a sectional view of the vertical-position grip portion illustrated in FIG. 7.

FIG. 7 illustrates an enlarged view of the second slit 204 and the second antenna substrate 94. FIG. 8 illustrates a section taken along line A-A in FIG. 7.

An antenna pattern 224 as a feedline is formed on the second antenna substrate 94. When viewed from the thick-ness direction of the front cover 110, the second antenna substrate 94 is placed in close contact with the front cover 110 at a position where the antenna pattern 224 overlaps the second slit 204 and diagonally crosses the second slit 204. The second antenna substrate 94 is fixed onto the front cover 110 with two screws 226 as conductive fastening members. The ground of the second antenna substrate 94 is electrically connected to the front cover 110 by the screws 226.

The first antenna substrate 92 is also placed in close contact with the front cover 110 at a position where its antenna pattern overlaps and diagonally crosses the first slit 202, and is fixed onto the front cover 110 with two conduc-tive screws. The rear antenna substrate 96 is placed in close contact with the rear cover 112 at a position where its antenna pattern overlaps and diagonally crosses the rear slit 206, and is fixed onto the rear cover 112 with two conductive screws. The side antenna substrate 98 is placed in close contact with the front cover 110 at a position where its antenna pattern overlaps and diagonally crosses the side slit 208, and is fixed onto the front cover 110 with two conduc-tive screws.

Figure 9:
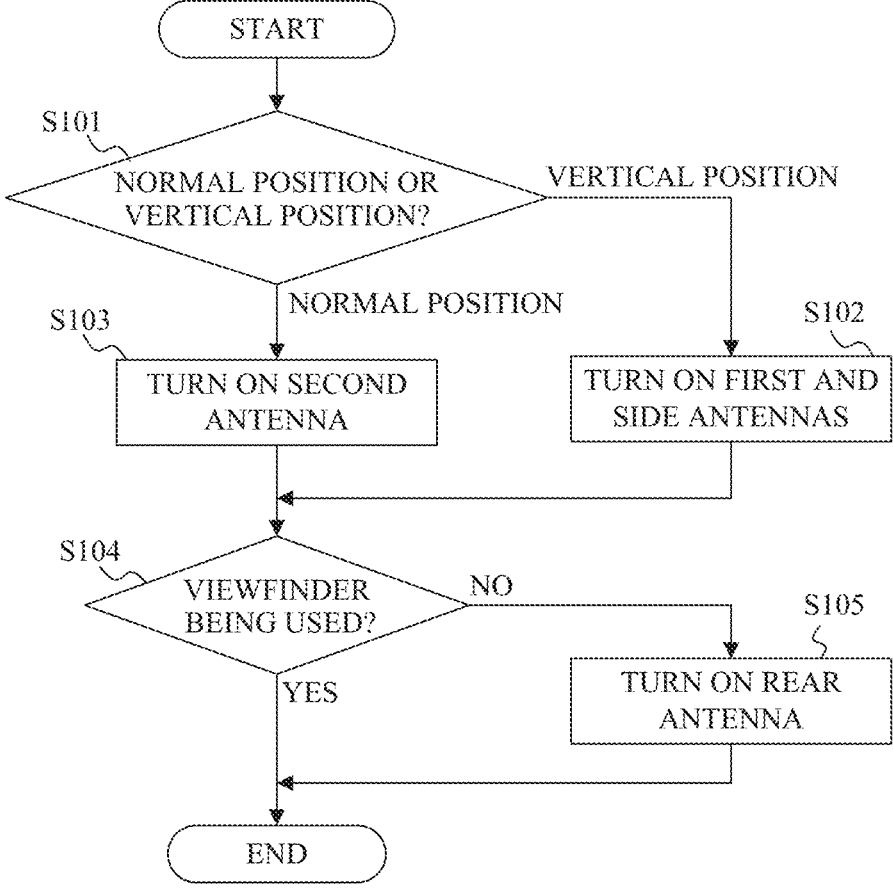
FIG. 9 is a flowchart illustrating processing according to the embodiment.

In the thus-configured camera 100, the system control unit 50 executes the processing (control method) relating to wireless communication illustrated in the flowchart of FIG. 9 according to a program.

First, in step S101, the system control unit 50 determines which of the normal-position grip portion 130 and the vertical-position grip portion 132 is being used (grasped) by the user through the normal-position grip detector 82 and the vertical-position grip detector 84. In a case where the normal-position grip portion 130 is used, the processing of step S102 is performed, and in a case where the vertical-position grip portion 132 is used, the processing of step S103 is performed.

In step S102, the system control unit 50 controls the communication control unit 90 to supply power to the first slit 202 and the side slit 208 through the first antenna substrate 92 and the side antenna substrate 98. Thereby, the first slit 202 and the side slit 208 function as slot antennas to start wireless communication with the outside.

In step S103, the system control unit 50 controls the communication control unit 90 to supply power to the second slit 204 through the second antenna substrate 94. Thereby, the second slit 204 functions as a slot antenna to start wireless communication with the external device.

Thus, this embodiment performs wireless communication with the external device using other slot antennas, without using the slot antennas disposed at or near the grip portion that is being gripped by the user. Thereby, the wireless communication performance can be prevented from being degraded by the user's hand covering the slot antenna. Furthermore, this embodiment provides two slot antennas (first and second slits 202 and 204) in the front cover 110 located on the opposite side of the user gripping the camera 100, and performs wireless communication using one of them. Thereby, the influence of radio waves of wireless communication on the user's body can be suppressed.

Next, in step S104, the system control unit 50 determines whether the user is using (peeping into) the viewfinder 70 through the eye proximity detector 72. In a case where the viewfinder 70 is being used, the system control unit 50 ends this flow. This is to prevent the radio waves of wireless communication from affecting the body of the user whose head (face) is close to the rear slit 206.

On the other hand, in a case where the viewfinder 70 is not being used, the system control unit 50 controls the commu-nication control unit 90 to supply power to the rear slit 206 through the rear antenna substrate 96 in step S105. Thereby, the rear slit 206 functions as a slot antenna to start wireless communication with the external device. Thereafter, this flow ends.

In a case where the user is using the viewfinder 70 in step S104, wireless communication may be performed through the rear slit 206 at a radio wave intensity that does not affect the human body in terms of Specific Absorption Rate (SAR). That is, while the viewfinder 70 is used, wireless commu-nication through the rear slit 206 may be prohibited or restricted by reducing the radio field intensity.

In a case where the use or non-use state of the grip portion or viewfinder as a detection result of each detector changes, the system control unit 50 may control the communication control unit 90 to change the slit to which power is supplied according to the change.

This embodiment provides at least four slits functioning as slot antennas in the front and rear covers 110 and 120, but may provide at least two slits (first and second slits) in the front cover 110.

This embodiment directly detects the gripping state of each grip portion in order to determine which grip is being used among the normal-position grip portion 130 and the vertical-position grip portion 132. However, the use of each grip portion may be determined (estimated) by detecting the orientation of the camera 100 using an orientation sensor such as a gyro.

While the disclosure has described example embodiments, it is to be understood that some embodiments are not limited to the disclosed embodiments. The scope of the following claims is to be accorded the broadest interpretation so as to encompass all such modifications and equivalent structures and functions.

This embodiment can provide an image pickup apparatus that can have excellent communication performance using a slot antenna.

This application claims priority to Japanese Patent Application No. 2023-099890, which was filed on Jun. 19, 2023, and which is hereby incorporated by reference herein in its entirety.

What is claimed is:

1. An image pickup apparatus capable of wireless communication with an external device, the image pickup apparatus comprising:

a housing made of metal and provided in one of a front surface on an object side, a rear surface, and a side surface of the image pickup apparatus, the housing having a slit as an opening; and a feed substrate configured to supply power to the slit to enable wireless communication using the slit as a slot antenna, wherein the slit extends in a vertical direction when the image pickup apparatus is gripped by a user so as to be held in a normal position or a vertical position, and the slit has in the vertical direction a length based on a half of a wavelength of a radio wave in the wireless communication.

2. The image pickup apparatus according to claim 1, wherein at least a front housing, which is the housing provided on the front surface, has the slit.

3. The image pickup apparatus according to claim 2, wherein the front housing has a grip portion to be gripped by the user, and wherein the slit is provided between the grip portion and a lens attachment unit of the front housing or in the grip portion.

4. The image pickup apparatus according to claim 3, wherein the slit extends along a longitudinal direction of the grip portion.

5. The image pickup apparatus according to claim 4, wherein the front housing includes a first grip portion to be gripped by the user in the normal position, and a second grip portion to be gripped by the user in the vertical position, wherein a first slit as the slit is provided between the first grip portion and the lens attachment unit or in the first grip portion of the front housing, and a second slit as the slit is provided between the second grip portion and the lens attachment unit or in the second grip portion of the front housing, and wherein the feed substrate is provided for each of the first slit and the second slit.

6. The image pickup apparatus according to claim 1, wherein the feed substrate has a feedline that overlaps the slit and diagonally crosses the slit on a rear side of the housing.

7. The image pickup apparatus according to claim 1, wherein the feed substrate is electrically connected to the housing by a conductive fastening member.

8. The image pickup apparatus according to claim 1, wherein the slit is covered with a nonconductive member attached to an outer surface of the housing.

9. The image pickup apparatus according to claim 5, further comprising a control unit configured to control power supply from the feed substrate to the first slit and the second slit, wherein the control unit determines which of the first grip portion and the second grip portion is being gripped by the user, and wherein, in a case where the first grip portion is being gripped by the user, the control unit supplies power to the second slit, and in a case where the second grip portion is being gripped by the user, the control unit supplies power to the first slit.

10. The image pickup apparatus according to claim 9, further comprising:

a rear housing having a third slit as the housing provided on the rear surface; and a viewfinder through which the user is to observe an object;

wherein the control unit is configured to control power supply to the third slit from the feed substrate, wherein the control unit limits power supply to the third slit in a case where the control unit detects an eye of the user is close to the viewfinder.

11. An image pickup apparatus comprising:

a front housing made of metal, disposed on an object side, and having a first slit and a second slit, the front housing including a first grip portion to be gripped by a user so that the image pickup apparatus is held in a normal position, and a second grip portion to be gripped by the user so that the image pickup apparatus is held in a vertical position;

a feed substrate configured to supply power to the first slit and the second slit to enable wireless communication using the first slit and the second slit as slot antennas; and a control unit configured to select one of the first slit and the second slit to which power is to be supplied, according to which of the first grip portion and the second grip portion is being gripped by the user.

12. A control method for an image pickup apparatus that includes a front housing made of metal, disposed on an object side, and having a first slit and a second slit, the front housing including a first grip portion to be gripped by a user so that the image pickup apparatus is held in a normal position, and a second grip portion to be gripped by the user so that the image pickup apparatus is held in a vertical position, and a feed substrate configured to supply power to the first slit and the second slit to enable wireless communication using the first slit and the second slit as slot antennas, the control method comprising the steps of:

determining which of the first grip portion and the second grip portion is being gripped by the user; and selecting one of the first slit and the second slit to which power is to be supplied, according to a result of the determining step.

13. A non-transitory computer-readable storage medium storing a program that causes a computer to execute the control method according to claim 12.

* * * * *